United States Patent [19]
Burger et al.

[11] Patent Number: 4,464,646
[45] Date of Patent: Aug. 7, 1984

[54] CONTROLLED TEMPERATURE COEFFICIENT THIN-FILM CIRCUIT ELEMENT

[75] Inventors: Kurt Burger, Friolzheim; Heinz Friedrich, Stuttgart; Heiko Gruner, Gerlingen; Karl-Otto Linn; Erich Zabler, both of Karlsruhe, all of Fed. Rep. of Germany

[73] Assignee: Robert Bosch GmbH, Stuttgart, Fed. Rep. of Germany

[21] Appl. No.: 281,169

[22] Filed: Jul. 7, 1981

[30] Foreign Application Priority Data

Aug. 2, 1980 [DE] Fed. Rep. of Germany ....... 3029446

[51] Int. Cl.³ .......................... H01C 7/06; H01C 1/12
[52] U.S. Cl. .......................................... 338/25; 338/9; 338/22 R; 338/308; 338/314; 338/334
[58] Field of Search ................... 338/25, 22 R, 9, 308, 338/309, 314, 307, 295, 334; 29/610 R, 612, 620; 252/514; 331/176

[56] References Cited

U.S. PATENT DOCUMENTS

| | | | |
|---|---|---|---|
| 3,199,050 | 8/1965 | Schleenbecker | 331/176 |
| 3,513,411 | 1/1968 | Everhart | 331/176 |
| 4,019,168 | 4/1977 | Collins | 338/309 |
| 4,079,349 | 3/1978 | Dorfeld | 338/9 |
| 4,104,607 | 8/1978 | Jones | 338/9 |
| 4,172,718 | 10/1979 | Menzel | 338/308 X |

FOREIGN PATENT DOCUMENTS

| | | | |
|---|---|---|---|
| 16263 | 10/1980 | European Pat. Off. | 338/25 |
| 2440618 | 7/1980 | France | 338/334 |
| 53-103194 | 9/1978 | Japan | 338/9 |
| 3133800 | 11/1978 | Japan | 338/308 |
| 4008865 | 1/1979 | Japan | 338/309 |
| 54-34901 | 9/1979 | Japan | 338/314 |

Primary Examiner—Roy N. Envall, Jr.
Assistant Examiner—Christopher N. Sears
Attorney, Agent, or Firm—Frishauf, Holtz, Goodman & Woodward

[57] ABSTRACT

To form a temperature sensor, for example suitable in an automotive vehicle, to determine ambient temperatures, or to provide a temperature compensated thin-film circuit, for example for incorporation with an oscillator circuit, two stable thin-film layers are applied to a nonconductive substrate, the layers being capable of being etched. The overall temperature coefficient of resistance can be matched to a predetermined value by selective interconnection of at least two thin-film resistance elements formed by the thin films, of which one thin film resistance element for example comprises a nickel layer over a tantalum base, with a predetermined temperature coefficient of resistance, the other resistance element merely being the tantalum layer with essentially zero temperature coefficient of resistance, the overall temperature coefficient of resistance of the combination being determined by adjustment of the relative resistance values after measurement of the temperature coefficient of resistance of the nickel-tantalum layer to determine its actual temperature coefficient so that, in spite of tolerances in the manufacture of the thin films, interchangeable elements of highly accurate overall resistance and temperature coefficient of resistance values can be obtained.

11 Claims, 11 Drawing Figures

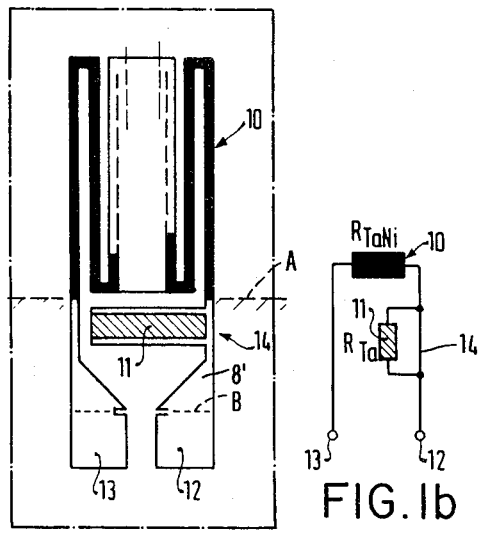
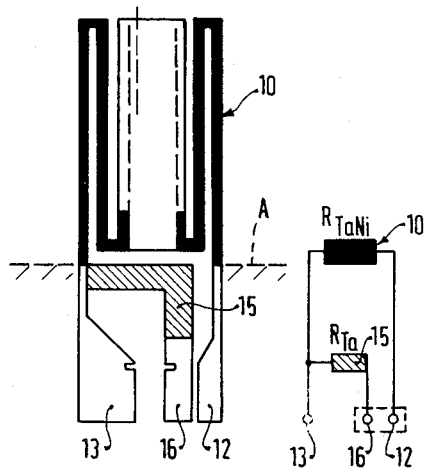
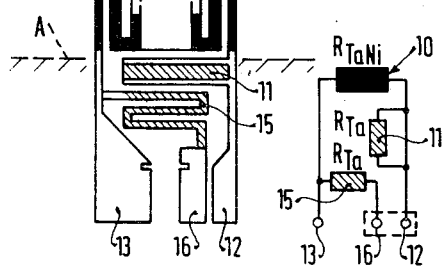
FIG.1a  FIG.1b  FIG.2a  FIG.2b  FIG.3a  FIG.3b

FIG. 4a
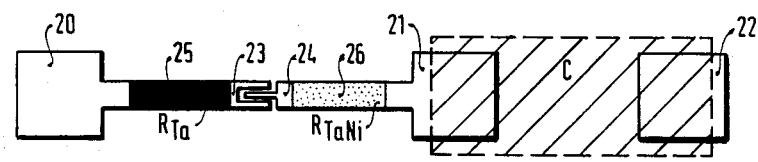
FIG. 4b
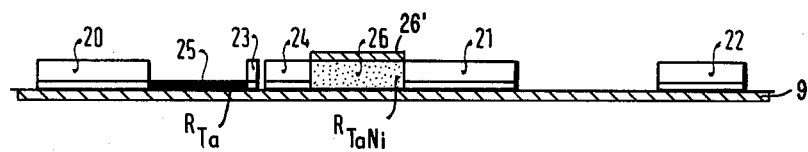
FIG. 4c
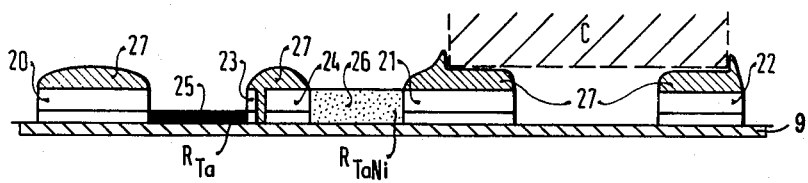

FIG. 4e
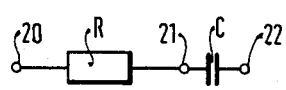
FIG. 4f
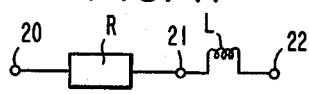
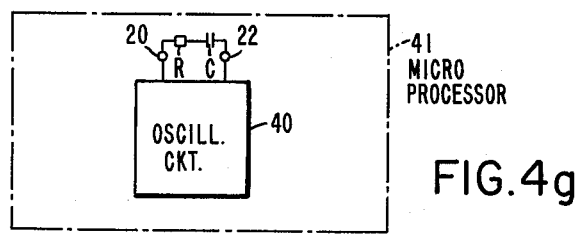
FIG. 4g

CONTROLLED TEMPERATURE COEFFICIENT THIN-FILM CIRCUIT ELEMENT

The invention relates to a thin-film circuit element or circuit structure which can be used as a temperature sensor or as part of the further thin-film circuit which is temperature compensated or which has a predetermined temperature coefficient of operation, for example a frequency controlled circuit in an oscillator which may form part of the clock circuit of a microcomputer or microprocessor.

BACKGROUND

Various types of thin-film circuits having predetermined temperature coefficients of resistance have been proposed, used essentially in temperature sensors. One such arrangement utilizes a thin-film temperature sensor for rapid measuring of temperature in liquids in gases. The sensor has a temperature sensitive element made of a layer of nickel which is applied directly or over an adhesion-promoting intermediate layer of high-resistance material to an insulating substrate plate. The nickel layer forming the temperature sensing element is applied, preferably, in undulating or meander shape as a thin film, forming a planar pattern on the substrate plate. The layer of nickel, and, if needed and used, the intermediate layer, are applied to the substrate by powder deposition. The particular shape of the temperature sensing element is then formed by selective etching, using a mask, in accordance with well known photo masking and etching technology.

THE INVENTION

It is an object to form a thin-film circuit which has a controlled and readily predetermined temperature coefficient of operation, for example a specific temperature coefficient of resistance, useful as a temperature sensor or, and particularly when used in combination with other circuit elements, which may be discrete circuit elements, to compensate variations in characteristics with temperatures of the other elements to maintain a uniform, all-over circuit characteristic, for example a uniform operating frequency of an oscillator circuit.

Briefly, a substrate has applied thereto two respectively distinct thin-film resistance layers, in which the respective thin-film resistance layers are interconnected and have individually different temperature coefficients of resistance, to provide, in view of the interconnection, a circuit element in which the overall temperature coefficient of resistance is controlled and may have a predetermined value.

The thin-film structure of the present invention has the advantage that the coating of the thin-film structure can be applied without requiring further matching of the temperature coefficient of the thin-film structure without external or additional elements. Thus, the entire thin-film circuit arrangement has, inherently, a controlled temperature coefficient of operation, for example uniform operation independent of temperature variation.

The thin-film structure can be used as part of a thin-film hybrid circuit, as well as for thin-film temperature sensors. The combination of resistance elements with different temperature coefficients permits controlled adjustment of the overall temperature coefficient of the entire element, forming a resistance for example. The thin-film arrangement can be used, for example, to control a temperature coefficient of an overall resistance element in such a manner that, for example, the temperature variation or tolerance of mass-produced resistors is compensated so that the overall temperature coefficient of resistance of the mass-produced resistor in combination with the thin-film circuit of the present invention will be essentially zero. Thus, the tolerance variations of mass-produced resistors are compensated by thin-film elements in accordance with the present invention having an oppositely directed temperature coefficient of resistance. The external element may be a resistor or an impedance element such as, for example, a capacitor or an inductance. The temperature coefficient of resistance of the thin-film circuit so affects an existing circuit that the temperature coefficient of operation of the external or existing circuit is compensated by the temperature coefficient of resistance of the thin-film circuit alone, or in combination with additional circuit elements, such as a plain resistor, or an impedance element such as a capacitor or a coil, forming, for example, an R/C element.

When used as a temperature sensor, the element is particularly suitable, for example, to determine ambient air temperature and provide an air temperature signal to an on-board signal processor or computer in a motor vehicle. Such elements must be accurate in the signal output and, additionally, have to be all the same so that they can be readily interchanged. Such interchangeability can be obtained only if not only the inherent resistance at a given temperature of all elements is the same, but also if the temperature coefficient upon varying temperatures is the same.

DRAWINGS:

FIG. 1a is a highly schematic plan view of a series circuit temperature sensing element;

FIG. 1b is the equivalent electrical circuit;

FIG. 2a is a highly schematic plan view of a parallel circuit sensor;

FIG. 2b is the equivalent electrical circuit;

FIG. 3a is a plan view of a combination series-parallel circuit sensor;

FIG. 3b is the equivalent electrical circuit diagram;

Figure 4D:
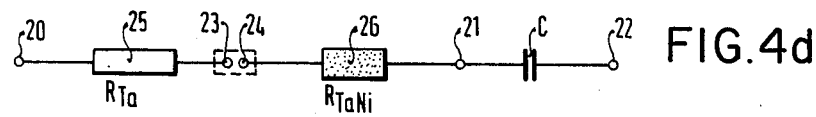

FIG. 4, collectively, illustrates a hybrid circuit element, and steps in the manufacture thereof, wherein FIG. 4a is a plan view;

FIG. 4b is a side view;

FIG. 4c is a side view after tinning;

FIG. 4d is a detailed equivalent electrical circuit;

FIG. 4e is an overall electrical circuit with a capacitor impedance element;

FIG. 4f is an equivalent electrical circuit with an inductance impedance element; and FIG. 4g is a highly schematic representation of the circuit as part of a microprocessor.

FIG. 1, collectively, illustrates a temperature sensor which has a temperature-dependent resistor 10 which is series connected with a temperature-independent resistor 11. The resistance of temperature-dependent resistor 10 is schematically shown as $R_{TaNi}$ since, preferably, the temperature-dependent thin-film resistor is made of a tantalum nickel compound. The temperature-independent resistor 11, being made only of tantalum, is indicated at $R_{Ta}$. The region below the broken line A includes two connecting tabs 12, 13; this region is tinned. The tantalum resistor 11 is not tin-coated. Tinning can be carried out in a solder bath; since tantalum is not wetted by solder, no solder or tin will adhere thereto. The tinned portion, of course, is highly conductive.

As used herein, the terms "tantalum", "tantalum layer", "tantalum resistor", and the like, will be used in order to simplify the terminology for the layer; they are deemed to include, however, not only pure tantalum, but also tantalum nitride, or tantalum oxinitride, for example. The equivalent circuit of FIG. 1b clearly shows that, initially, the temperature-independent tantalum resistor 11 is shunted or bridged by a bridge connection 14. The thin film is applied to a substrate 9, shown schematically only in chain-dotted lines and only in FIG. 1a; similar substrates are used in the other embodiments and have been omitted therefrom for ease of illustration.

The thin-film arrangements in accordance with FIGS. 2 and 3, collectively, are basically similarly constructed and similar elements have been given the same reference numeral. A temperature-independent resistor 15 ($R_{Ta}$) is connected in parallel to the temperature-dependent resistor 10 ($R_{TaNi}$). The unit of FIG. 3 includes a series resistor 11 as well as a parallel resistor 15, both of which are temperature-independent, and thus have resistances generally shown as $R_{Ta}$. A further connection tab 16 is provided in both of the structures of FIGS. 2 and 3 for the parallel resistor 15. The region below the broken line A, as in the embodiment of FIG. 1, is tinned and thus highly conductive, for example by having been dipped into a solder bath, in order to provide good terminal contacts for the element. The tantalum resistors 11, 15 again will be free from tin.

Tantalum nickel, that is, TaNi, thin-film temperature resistors can have a temperature coefficient of resistance which is essentially independent of the thickness of the film layer if the film layer does not exceed about 250 nm by suitable choice of production methods, as well known. Such temperature sensors have a temperature coefficient of resistance, hereinafter TCR, of about $5.5 \cdot 10^{-3}/°C$. and an area resistance of 0.5 ohm. It has been found that such temperature-dependent resistors which are made in mass production will have a dispersion tolerance of ±10% from a commanded or desired value and a dispersion tolerance of the temperature coefficient of resistance of ±4% from commanded or desired value. The tolerances are due to inaccuracies in manufacture. The deviation of the resistance from commanded value can be compensated by calibration by means of a laser, for example to an accuracy of ±0.1%.

The present invention provides an element in which not only the resistance is accurately calibrated but, additionally, the temperature coefficient of the thin-film arrangement likewise is calibrated—which was not possible to do heretofore. This is particularly important if the element is to be used as a temperature sensor to determine, for example, ambient temperature in combination with the on-board computer of a motor vehicle in which, in order to permit interchangeability of TaNi sensors both the resistance as well as the temperature coefficient are all accurately matched, and hence are capable of being calibrated with high accuracy to a desired or command value.

The layer system which is used in the thin-film elements in accordance with the present invention employs a tantalum layer on which a nickel layer is applied. The tantalum layer, applied to a substrate 9, for example of ceramic, is capable of providing essentially temperature-independent resistors which are stable over long periods of time. A nickel layer is placed over the tantalum layer, the nickel layer being selectively etched off from the tantalum layer. The tantalum layer which is left will have a thickness of about 50 nm. The square or area resistance of the tantalum layer is greater by a factor of at least 100 than the area or square resistance of the nickel layer. The influence of the tantalum layer on the temperature resistance change of the nickel layer is practically neglectable. The adhesion of the nickel layer on the substrate, however, is substantially improved by the presence of the tantalum layer beneath the nickel layer.

The thin-film element, as illustrated in FIGS. 1, 2 and 3, thus includes two areal single layers, both stable in their characteristics over long periods of time, and which are treated by means of etching, especially by masking or photo etching technology, in accordance with any well known process. The photographic etching technology is used to form a meander-shaped nickel path or track to define the temperature-dependent resistor 10 on the composite tantalum-nickel layer. Where the nickel layer is entirely removed, the temperature-independent resistor 11 is formed from the overall structure.

The tantalum-nickel layer system can, thus, provide two different resistors on a single substrate upon application, essentially, of one composite layer of nickel over tantalum and by selective etching, and thus provide temperature-independent resistors 11, 15, where the resistor is formed only by tantalum, as well as the temperature-dependent resistor 10, where the resistor is, essentially, formed by the nickel layer over the tantalum. This capability of forming both temperature-independent resistors 11, 15 as well as the temperature-dependent resistor 10 permits calibration of the temperature coefficient of resistance of the nickel-tantalum layer and thus to the possibility to calibrate the temperature coefficient of the overall element by series and/or parallel connection of the two resistance types—temperature-independent resistors 11, 15 and the temperature-dependent resistor 10. In this manner, the temperature coefficient of the overall layer system, Ni+Ta, of the resistors can be controlled to a predetermined value by selective interconnection of at least two thin-film resistance elements, namely the elements having the resistances $R_{TaNi}$ and $R_{Ta}$, each with a different temperature coefficient of resistance. The overall layer system of nickel and tantalum thus is used to make the temperature-dependent resistor $R_{TaNi}$ and the tantalum portion of the layer system is used to make the temperature-independent resistor $R_{Ta}$. Thus, the temperature coefficient of resistance of the overall resistor can be controlled by selective series connection—see FIG. 1, parallel connection—see FIG. 2, or series-parallel connection—see FIG. 3, of the temperature-independent resistors 11, 15 respectively and the respective temperature-dependent resistor 10. The temperature coefficient of the overall system or element can be changed in the combination within the limits of the temperature coefficients of the individual resistance components.

When using the thin-film system to make a temperature sensor, the temperature coefficient of the temperature-dependent thin-film resistor 10 is controlled to have a predetermined lower value by adding an essentially temperature-independent thin-film resistor 11 or 15 in the circuit. The temperature coefficient of the IaNi layer is arranged to fall on the lower limit of the tolerance range in the manufacture, that is, within the permitted or tolerance deviation arising in manufacture. The calibration of the temperature coefficient of the overall structure then is effected by compensation of the variations in characteristics of the temperature-dependent element 10 by series or series-parallel connection of the tantalum resistor 11, so that the tolerance range from a predetermined commanded or desired value can be eliminated.

The meander-shaped portion of the sensor retains the combination made of tantalum and nickel; in the range of the temperature-independent compensating resistor 11, the uppermost nickel layer is removed by etching. In the zones on the substrate where no meander-shaped track and no resistor is to be placed, both the nickel and the tantalum layer are etched off, to leave only the meander-shaped TaNi track of the sensor portion, the Ta region of the resistor 11, and the connecting tabs 12, 13, which can be tinned.

Example of a temperature sensor, Example 1: A temperature sensor is to be provided which has a resistance of 1000 ohms at a nominal temperature of 20° C. The resistance R=1000 ohms is a composite, in accordance with the arrangement of FIG. 1, as follows:

$$R = R_{Ta} + R_{TaNi} = 1000 \text{ ohms.}$$

The mathematical derivation is given on the listing of formulae attached hereto and forming part of this specification, wherein TCR stands for the temperature coefficient of resistance in relation to the appropriate subscript. See equations (1) to (6).

$$TCR_{Ta} = 8.0 \times 10^{-5}/°C. \pm 10\%,$$

if tantalum oxinitride is used as the practically temperature-independent resistance. The subscript "com" stands for "command, so that $TCR_{com}$ is the commanded or desired temperature coefficient of resistance.

The temperature coefficient of the sensor having a TaNi layer has a tolerance band or range of between 5.2 ... 5.6×10⁻³/°C. The temperature coefficient of resistance of the tantalum-nickel layer should be so calibrated that it falls on the lower level of the range of tolerance, that is, for example on 5.2×10⁻³/°C. which can be accomplished by the various circuit arrangements illustrated in FIGS. 1 to 3. Due to the essential temperature indepence of the tantalum resistor 11, the resulting temperature coefficient of the overall system can be calibrated only to the lower value of the tolerance range. In the example given, and with the layers as described, $$R_{TaNi} = 928.6 \text{ ohms} \ldots 1000 \text{ ohms}$$

$$R_{Ta} = 71.4 \text{ ohms} \ldots 0 \text{ ohms.}$$

The values given are appropriate at the above referred-to value R=1000 ohms for a calibration temperature of 20° C.

Calibration: First, the temperature-independent resistor 11 is bridged or shunted by the shunt 14. The unit is then aged, in accordance with well known methods, for example by heat treatment, to increase the long-time stability of the thin-film layer resistors. Thereafter, the layer resistance of the temperature-dependent resistor is measured at different temperatures, for example at 0° C. From these measurements, the temperature coefficient $TCR_{act} = TCR_{TaNi}$ can be determined, wherein the subscript "act" stands for "actual". The predetermined temperature coefficient $TCR_{com}$ at the lower limit is 5.2×10⁻³/°C. In a serial connection in accordance with FIG. 1, the $R = R_{Ta} + R_{TaNi}$; from which, approximately, equation (6) results, wherein $TCR_{Ta}$ is considered to be zero, since the value will be so small that it can be neglected. Equation (6) is also reproduced on the listing of equations.

From the foregoing mathematical derivation, and upon knowing the temperature coefficient of resistance, and the overall resistance of the resistors 10, 11 at the calibration temperature, the values for the resistances 10, 11—at calibration temperature—can be calculated. At the predetermined calibration temperature—in the example selected 20° C.—the resistor 10 is calibrated to the calculated value. Thereafter, the bridge 14 is severed, so that the electrical shunt formed thereby is removed, and the resistor 11 is calibrated to its calculated value, so that the overall resistance $R = R_{Ta} + R_{TaNi} = 1000$ ohms is obtained. Calibration of the respective resistors to the calculated resistance values can be done, for example, by selective vaporization by a laser beam or the like, in accordance with known technology.

Embodiment of FIG. 2, parallel connection: Basically, the sequence of calibration is similar. Initially, measurement is done separately of the resistor 10 and the resistor 15 and, to do so, a connection between the tabs 12, 16 is interrupted. After measuring the resistance of resistor 10 at different temperatures, for example again at 0° C. and 100° C., and subsequent computation of the temperature coefficient of resistance of resistor 10, that is, $TCR_{TaNi}$, the resistances are calculated in accordance with the equations (7), (8), (9).

The resistances of the temperature-dependent resistors are determinable from the equations (7), (8), (9); the essentially temperature-independent resistor, $R_{Ta}$, is assumed to have a coefficient of zero since, as in the example of FIG. 1, its temperature coefficient is so small that it can be neglected.

After computation of the resistance values and calibration of the resistance values of the respective resistors, again for example by a controlled laser beam, the connecting flags or terminals 12, 16 are joined.

Embodiment of FIG. 3: The combined series-parallel resistance circuit in accordance with FIG. 3 can be calculated in accordance with the procedure explained in connection with FIGS. 1 and 2. The arrangement of FIG. 3 can be useful for special applications, for example if the resistance of resistor 10 must be equal to the overall resistance. In that case, an increased overall resistance value must be compensated for by a further connection of a resistor which does not have any substantial resistance change with temperature, i.e. by use of a parallel resistor 15.

The region 8, shown only in FIG. 1a, has a continuous meander track of the resistor 10. The region 8' below the broken line A, and up to the dotted line B, and which has been tinned by dip-soldering, is preferably encapsulated. The substrate 9, then, will have a projecting sensing resistor 10, projecting from the encapsulated main portion on the one side and terminal tabs 12, 13 on the other. Terminal 16, if used (FIGS. 2, 3) is shorted to terminal 12 upon tinning. A suitable arrangement on the substrate of the resistors 11 and 15 is shown in FIGS. 2a and 3a, for example.

Embodiment of FIG. 4: FIG. 4g shows a hybrid circuit used, for example, in combination with a temperature compensated RC circuit used, for example, in RC oscillators 40 which may form the clock of a microprocessor 31, and can, for example, be included on a common substrate or chip holder therefor.

FIG. 4a is a top or plan view of a temperature compensated arrangement, and FIG. 4b shows a vertical, or example essentially central section therethrough, in which, in FIG. 4b, an external capacitor C has been omitted for clarity. A substrate 9, not shown in FIG. 4a, has connecting tabs or terminals 20, 21, 22 applied thereto to form external connections of the temperature compensated system. Two further terminals 23, 24 are placed on the substrate. The terminals 23, 24 can be selectively connected or disconnected. They form a connection between an essentially temperature-independent resistor 25 having a resistance $R_{Ta}$, and a temperature-dependent resistor 26 having a resistance $R_{TaNi}$. These two resistors can be formed, as in the above example, by first placing a tantalum layer on the substrate and then a nickel layer thereover, and then, selectively, etching off the nickel where the resistor 25 is to be placed. A capacitor C is located between the terminals 21, 22—see FIGS. 4a, 4c. Bascially, any impedance element can be used, and rather than using a capacitor, a coil L—see FIG. 4f—may also be connected between the terminals 21, 22.

The basic element, as shown in FIGS. 4a, 4b, without the impedance element C, then is masked as schematically shown by the mask 26' applied over the temperature-dependent resistor 26. The masked unit is then tinned, which will leave a tin coating 27 over the exposed terminals. The capacitor C is soldered to the now tinned terminals 21, 22. Terminal 20 is available for further connection. The tin, applied for example in a solder bath, does not coat the temperature-independent resistor 25, since tantalum is not wetted by tin. The temperature-dependent resistor 26 also is free from solder or tin, since it was masked by the mask 26'.

What is obtained, then, is a serial circuit including a temperature-independent resistor 25 of tantalum and a temperature dependent resistor 26 of tantalum and nickel. The connecting terminals 23, 24 are separated before tinning and are short-circuited by the tin coating. The resistors 25, 26 together form the equivalent overall resistance R as shown in the equivalent circuit of FIG. 4e.

To obtain high base clock frequencies, it has been customary to use quartz controlled oscillators. Microcomputers utilized in automotive vehicles also had such quartz oscillators used in connection therewith. For automotive application, quartz oscillators are undesirable since quartz oscillators are comparatively delicate elements, ill suited for the rough and environmentally highly changeable use in automotive vehicles. Excessive failure rates and costs, and excessive requirements on overall quality were thus placed on such oscillators. Utilization of RC elements in RC oscillators was limited due to the low operating frequency thereof and due to the change in frequency upon change in temperature. Thus, the temperature coefficient of operation of an RC oscillator limited the use of RC circuits. The thin-film element of the present invention permits compensation of the temperature coefficient of operation of the overall oscillator, as well as of the element itself. It is entirely possible to so control the temperature coefficient of operation of the combined RC circuit or system, by itself or in combination with an external oscillator circuit 40 (FIG. 4g), that the overall compensation of the overall temperature coefficient of operation of the entire circuit can be obtained. Thus, the temperature coefficient of operation of the resistance element alone can be so controlled that the temperature coefficient of the entire system—resistor, impedance element and, if desired, other extraneous elements—can all be considered by the resistor itself. Specifically, it is possible to match the temperature coefficient of operation of the RC element to the temperature variation in operation of transistors and other RC circuit components connected thereto. In accordance with the invention, the possibility thus presents itself to compensate the temperature coefficient of capacity of a capacitor C in a hybrid circuit by adding a thin-film resistance R formed of the components $R_{Ta} + R_{TaNi}$ with appropriate opposite temperature coefficients of operation. Additionally, it is possible to compensate the temperature coefficient of operation of an entire electronic network by so controlling the temperature coefficient of operation of the RC element that it will not be zero but, rather, will have an overall value which compensates for the temperature coefficient of operation of the remaining circuit. The temperature coefficient of operation of the RC element then will be so arranged that it has a capacitative—or inductive—structural element combined with a resistance system determining the temperature coefficient of the overall element, and formed by resistors 25, 26. Of course, an RL arrangement—FIG. 4f—can be used, if desired, in place of the RC network, FIG. 4e.

The relationships appropriate for FIG. 4 are shown in equations (10), (11a) and (11b), in which equation (11a) is for a capacitor having a temperature coefficient of capacity TCC, and equation (11b) is for a coil having a temperature coefficient of inductance TCL; TCR, again, is the temperature coefficient of resistance.

Calibration: The temperature coefficient of the RC (or RL) circuit in accordance with FIG. 4 is again detected by testing resistance of the temperature-independent resistor 25 and the temperature-dependent resistor 26, calculating resistance values, and then controlling the resistances of the resistors 25, 26 in accordance with the calculation. Rather than using the series circuit shown in FIG. 4d, a parallel circuit or a series-parallel circuit can be used, by appropriate arrangement of the position of the terminals 21-24. The temperature-independent resistance can use tantalum, or, in lieu thereof, for example nickel-chromium (NiCr), tantalum-nitride ($TaN_2$), or tantalumoxinitride ($TaO_xN_y$). As an alternative to the tantalum-nickel sequence of layers, materials with high positive temperature coefficient, for exaple platinum, gold or pure nickel, can be used. These variations, of course, are equally applicable for the embodiments of FIGS. 1, 2, 3. In manufacture, suitable masking can be used if a tinning bath should wet a specifically selected material.

EXAMPLE 2

A temperature-independent RC element is to be constructed, in which temperature compensation is obtained by setting the temperature coefficient TCR of the resistor component of the circuit equal to the opposite of the temperature coefficient of capacity of the capacitor element, mathematically, $TCR = -TCC$, in which the temperature-independent portion uses, for example, a pure tantalum resistor, and the temperature-dependent portion again is a thin-film tantalum-nickel resistor. Let it be assumed that the resistance R of the network is to be 10,000 ohms. Relationship (12) will be required, then resulting in equation (13). In this case, the temperature coefficient of resistance of the tantalum alone cannot be neglected anymore since the tantalum resistance will have a significant effect on the overall temperature coefficient of operation of the circuit combination. The temperature coefficient of resistance of tantalum is given as $$TCR_{Ta} = 8.0 \times 10^{-5}/°C.$$

in which tantalum-oxinitride is used as a tantalum resistance layer; the temperature coefficient of resistance of a tantalum-nickel film is $$TCR_{TaNi} = +5.5 \times 10^{-3}/°C.$$

The corresponding values for the resistance of the tantalum-nickel resistor 26 and the temperature coefficient of capacity are shown in the table given together with the mathematical relationships and forming part of the specification.

Method of manufacture: The resistances 25, 26, and terminals 20, 21, 22 and 23, 24 are applied to the substrate 9, in accordance with well known technology; the terminals 23, 24 between the resistors 25, 26 are separated initially.

The so prepared substrate and thin film thereon is then aged to increase the long-term stability of the unit. The temperature coefficients of resistance are then determined by measuring the resistances of resistors 25, 26 at different temperatures, for example at 0° C. and 100° C., in order to calculate the temperature coefficients of resistance $TCR_{Ta}$ and $TCR_{TaNi}$. Upon tinning, terminals 23, 24 will be connected—see FIG. 4c—and the terminal tabs 20, 21, 22 will become tinned. The mask 26' is removed, and the resistance values of the resistors 25, 26 is calibrated, for example by laser irradiation such that the overall resistance $$R = R_{Ta} + R_{TaNi} = 10 \text{ k ohms,}$$

at a calibration temperature of 20° C. It is possible that the transition resistances change upon dip-soldering. It is, therefore, preferred to calibrate the resistors after the resistances are connected, that is, after tinning, and utilizing the previously measured resistance values, that is, the resistance values measured before tinning. The resistance values $R_{Ta}$ and $R_{TaNi}$ of resistors 25, 26 are calculated in accordance with equations (12), (13) in view of the table to obtain compensating, matching temperature coefficients of change of electrical parameters, i.e. $TCR = -TCC$.

The thin-film element can thus be used to control accurately various external circuits, and particularly RC or RL oscillators at high operating frequencies without essential temperature drift. The accuracy of operation is substantially improved, and without using specially temperature controlled chambers. It is possible to use inexpensive chip capacitors with higher-than-usual values of capacity in hybrid circuits.

Various changes and modifications may be made, and features described in connection with any one of the embodiments may be used with any of the others, within the scope of the inventive concept.

$$R(T) = R(To) \times (1 + TCR_{com} \times \Delta T) \quad (1)$$

$$R_{Ta}(T) = R_{Ta}(To) \times (1 + TCR_{Ta} \times \Delta T) \quad (2)$$

$$R_{TaNi}(T) = R_{TaNi}(To) \times (1 + TCR_{TaNi} \times \Delta T) \quad (3)$$

-continued $$TCR_{TaNi} = TCR_{ist} = 5,2 \ldots 5,6 \times 10^{-3}/°C. = 5,4 \times 10^{-3}/°C. \pm 4\% \quad (4)$$

$$R_{TaNi}(T) \approx R(T) \times \frac{TCR_{com}}{TCR_{TaNi}} \quad (5)$$

$$R_{TaNi} \approx R \times \frac{TCR_{com}}{TCR_{TaNi}} \quad (6)$$

$$R_{TaNi} = R \times \frac{TCR_{TaNi} \times (1 + TCR_{com} \times \Delta T)}{TCR_{com} \times (1 + TCR_{TaNi} \times \Delta T)} \quad (7)$$

$$\approx R \times \frac{TCR_{TaNi}}{TCR_{com}} \quad (8)$$

$$R_{Ta} = \frac{R_{TaNi} \times R}{R_{TaNi} - R} \quad (9)$$

$$TCR = -TCC(TCR = -TCL) \text{ and/or} \quad (10)$$

$$TCR - TCC = a, \text{ wherein } a \leq TCR \text{ or} \quad (11a)$$

$$TCR - TCL = b, \text{ wherein } b \leq TCR \quad (11b)$$

$$R = R_{Ta} + R_{TaNi} \quad (12)$$

$$R_{TaNi} = R \times \frac{TCR_{com} - TCR_{Ta}}{TCR_{TaNi} - TCR_{Ta}} \quad (13)$$

TABLE

| $R_{TaNi}$[Ohm] | 143,4 | 412,2 | 537,6 | 734,8 | 914,0 | 1487,5 |
|---|---|---|---|---|---|---|
| $TCC$ [$10^{-6}/°C.$] | 0 | −150 | −220 | −330 | −470 | −750 |

We claim:

1. Thin-film circuit element with controlled temperature coefficient of resistance having
   a substrate (9);
   at least two distinct thin-film resistance layers (10, 11, 15), each of which comprises a metal which can be etched, applied to the substrate
   wherein, in accordance with the invention,
   the respective thin-film resistance layers (10, 11, 15, 25, 26) comprise a continuous layer of tantalum on the substrate;
   and a thin-film layer of nickel located over a portion of said layer of tantalum,
   to form a tantalum-nickel resistance layer providing a temperature-dependent resistor ($R_{TaNi}$), (10, 26), and
   a tantalum-only resistance layer providing an essentially temperature-independent resistor ($R_{Ta}$), (11, 15; 25),
   and wherein the respective thin-film resistors have individually different temperature coefficients of resistance ($R_{TaNi}$; $R_{Ta}$) to provide said circuit element with a temperature coefficient of resistance (RTC) which is controlled to have a predetermined value.

2. Element according to claim 1, wherein said temperature-dependent resistance layer ($R_{TaNi}$) and said temperature-independent resistance layer ($R_{Ta}$) form an electrically connected resistance network, the temperature coefficient of resistance of the overall network being variable within the limits of the respective temperature coefficient of resistance of the respective temperature-dependent and temperature-independent resistance layer.

3. Element according to claim 1, wherein the nickel-tantalum layer ($R_{TaNi}$) is selected to have a temperature coefficient of resistance at the lower portion of the range of temperature coefficients of resistance of any tantalum-nickel layer;

and wherein said temperature-independent resistance layer ($R_{Ta}$) is electrically interconnected with said tantalum-nickel layer.

4. Element according to claim 3, wherein (FIGS. 1, 4) said electrical interconnection forms a series circuit.

5. Element according to claim 1, wherein (FIG. 2) said electrical interconnection forms a parallel circuit.

6. Element according to claim 3, wherein (FIG. 3) two portions of tantalum-only resistance layers ($R_{Ta}$) forming two essentially temperature-independent resistors (11, 15) are provided, and said electrical interconnection forms a series-parallel circuit with said temperature-dependent layer ($R_{TaNi}$).

7. Element according to claim 1, wherein (FIGS. 1–3) said element comprises a temperature sensor;

and said thin-film resistance layers (10, 11) include multiple partially superimposed layer coatings placed on said substrate and formed by selective etching.

8. The combination of a thin-film resistance circuit element with controlled temperature coefficient of resistance having a substrate (9);

at least two distinct thin-film resistance layers (10, 11, 15), each of which comprises a metal which can be etched, applied to the substrate wherein the respective thin-film resistance layers (10, 11, 15, 25, 26) comprise a continuous layer of tantalum on the substrate;

and a thin-film layer of nickel located over a portion of said layer of tantalum, to form a tantalum-nickel resistance layer providing a temperature-dependent resistor ($R_{TaNi}$), (10, 26), and a tantalum-only resistance layer providing an essentially temperature-independent resistor ($R_{Ta}$), (11, 15; 25), and wherein the respective thin-film resistors have individually different temperature coefficients of resistance ($R_{TaNi}$, $R_{Ta}$) to provide said resistance circuit element with a temperature coefficient of resistance (RTC) which is controlled to have a predetermined value, with a reactance circuit element (CL) to form an oscillator circuit with the resistance circuit element, wherein circuit means (27) are provided connecting the resistance circuit element to the reactance circuit element to form therewith a combined resistance-reactance circuit connected to provide said oscillator (40);

and wherein the controlled temperature coefficient of resistance of said resistance element is controlled to compensate the temperature coefficient of operation of at least said reactance element (CL);

and said substrate is common to said resistance element and said reactance circuit element (CL) and supports said reactance circuit element.

9. The combination according to claim 8, wherein the temperature coefficient of said resistance element is controlled to compensate for the temperature coefficient of operation of said reactance element (CL) and circuit components connected thereto and at least forming part of said oscillator circuit (40).

10. The combination according to claim 8, wherein the temperature coefficient of resistance of said respective thin-film resistance layers (10, 11, 15; 26, 25) is controlled to be opposite the temperature coefficient (TCC, TCL) of operation of the reactance element (C, L).

11. The combination according to claim 8, wherein said reactance element is a capacitor (C), and the temperature coefficient of resistance of said layers (10, 11, 15; 26, 25) is essentially equal and opposite the temperature coefficient of capacity (TCC) of the capacitor (C).

* * * * *